United States Patent [19]
Granau et al.

[11] Patent Number: 5,848,252
[45] Date of Patent: Dec. 8, 1998

[54] PERIPHERAL COMPONENT INTERCONNECT GATEWAY CONTROLLER

[75] Inventors: Robert Henry Granau, Phoenix; Steven David Willis, Scottsdale; Mark David Summers, Phoenix, all of Ariz.; Craig Bayman McIntosh, Arlington Heights, Ill.

[73] Assignee: Motorola, Inc., Schamuburg, Ill.

[21] Appl. No.: 740,938

[22] Filed: Nov. 5, 1996

[51] Int. Cl.⁶ .............................. G06F 13/00; G06F 13/42
[52] U.S. Cl. ......................... 395/309; 395/308; 370/402
[58] Field of Search ................................... 395/309, 308, 395/306, 281, 200.8; 370/401, 402

[56] References Cited

U.S. PATENT DOCUMENTS

| | | | |
|---|---|---|---|
| 4,653,047 | 3/1987 | Vij et al. | 370/363 |
| 5,237,659 | 8/1993 | Takats | 395/200.66 |
| 5,345,578 | 9/1994 | Manasse | 711/146 |
| 5,388,089 | 2/1995 | Odaka et al. | 370/401 |
| 5,446,869 | 8/1995 | Padgett et al. | 395/500 |
| 5,535,341 | 7/1996 | Shah et al. | 395/306 |
| 5,555,383 | 9/1996 | Elazar et al. | 395/306 |
| 5,568,619 | 10/1996 | Blackledge et al. | 395/281 |
| 5,632,021 | 5/1997 | Jennings et al. | 395/309 |
| 5,649,161 | 7/1997 | Andrade et al. | 395/494 |
| 5,664,117 | 9/1997 | Shah et al. | 395/280 |
| 5,664,124 | 9/1997 | Katz et al. | 395/309 |
| 5,691,985 | 11/1997 | Lorenz et al. | 370/401 |
| 5,694,556 | 12/1997 | Neal et al. | 395/308 |

*Primary Examiner*—Gopal C. Ray
*Attorney, Agent, or Firm*—Frank J. Bogacz

[57] ABSTRACT

A gateway controller (100) for facilitating the exchange of information between PCI busses (101,103). The controller (100) may comprise a single printed wiring board (301) or two printed wiring boards (201,203) connected by cable (205). Busses (101, 103) are physically isolated from one another for security or other reasons.

This technique provides for controlled communication capability which does not require direct linking of two subsystem buses. This technique also provides for a method of transparent communication between subsystems. This gateway controller (100) allows data control while providing bus security and physical isolation of communication buses.

8 Claims, 3 Drawing Sheets

PERIPHERAL COMPONENT INTERCONNECT GATEWAY CONTROLLER

BACKGROUND OF THE INVENTION

The present invention relates to techniques for communication between devices and in particular to providing a communication technique for use between two or more buses while maintaining their independence and providing control over the interface.

While techniques exist for communication between buses these techniques require that a bridge be used providing a direct (merge) link between the buses. In such cases, there is no way to prevent data passing between the buses and no way to condition or convert the data or to provide security between one bus and the other. These techniques also preclude the transfer of data between buses operating at different speeds; the transfer of encrypted data; and situations where two way transfer must occur, but one of the buses must have its data maintained as secure.

Hence there is a need for a controlled communication capability that does not require a direct linking of the two subsystem buses and also provides a method of transparent communication and conversion/transfer capability. The need also exists for a method of connecting the two subsystem buses while maintaining simplicity in mechanical and electrical design.

DESCRIPTION OF THE PREFERRED EMBODIMENT

Generally, the present invention provides a PCI (Peripheral Component Interconnect) bus Gateway Controller 100 for controlling the flow of data and the conversion or translation of the data during the transfer process between multiple buses, such as 101 and 103. The Gateway Controller 100 can be accomplished by the use of commercially available PCI Port Buffered Interfaces 105 and 107, a commercially available System Processor 109 and standard commercially available System Resources 111. In the FIG. 1, a block diagram of a system for connecting two independent buses together for the purpose of providing control and conversion/transfer of the data is shown.

Figure 1:
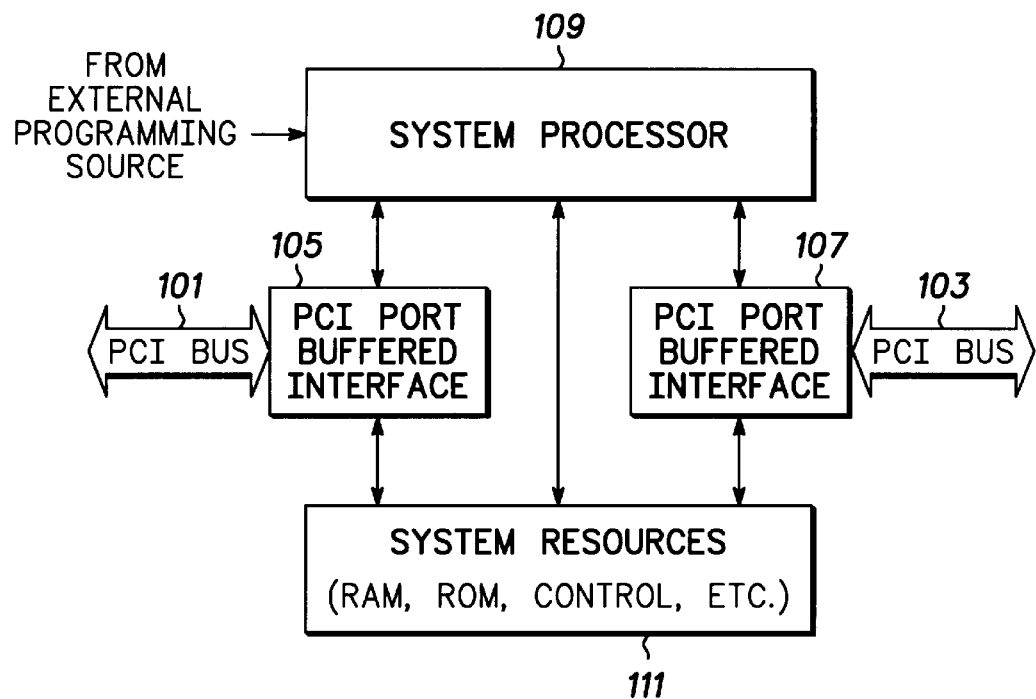
FIG. 1 is a block diagram illustrating the circuitry of a PCI (Peripheral Component Interconnect) Gateway Controller in accordance with the present invention.

In FIG. 1, data are received from the independent (separate) PCI Buses 101 or 103 by the PCI Port Buffered Interfaces 105 or 107. The PCI Port Buffered Interfaces 105 or 107 inform the System Processor 109 that data has been received. The System Processor 109 retrieves the data, stores the data in the System Resources 111, performs the required functions and transmits the data to the appropriate PCI Port Buffered Interface 105 or 107 for placing the data on the appropriate PCI Bus 101 or 103. These functions are determined by the programming inserted into the System Processor 109 as described below. Examples of peripherals that may be coupled to the PCI buses 101 and 103 include, but are not limited to, RS-232 interfaces, modems, multimedia processors DSP (Digital Signal Processor), GPS (Global Positioning System), single printed wiring board computers and routers.

Connection between each bus and the Gateway Controller 100 is by means of the independent PCI Buffered Interface 105 or 107. An example of a commercial part that can be used for each PCI Port Buffered Interface 105 or 107 is the Applied Micro Circuits Corp. integrated circuit AMCC S5933Q. A bus host (not shown) is connected to each PCI Port Buffered Interface 105 and 107 via the PCI buses 101 and 103, respectively. The bus host initializes the PCI Port Buffered Interfaces 105 and 107 by providing information as to which slots on the PCI bus are occupied by which bus printed wiring boards (not shown) performing specified functions. These bus printed wiring boards may be coupled to PCI Buses 101 and 103. A target bus printed wiring board is defined as a specific functional board in a specific slot that is to be communicated with by the Gateway Controller 100. Thus each PCI Port Buffered Interface 105 and 107 becomes a master node on PCI Buses 101 and 103, respectively. As a result, the Gateway Controller 100 can write to or read from any target bus printed wiring board directly without the use of the bus host.

Authorization for the transfer of data into and out of the PCI Port Buffered Interfaces 105 and 107 comes from both the bus host and the System Processor 109. Thus the PCI Buffered Interfaces 105 and 107 provide a communication means and communication isolation between the two connected PCI Buses 101 and 103.

The System Processor 109 organizes and manages the data flow between the two PCI Buses 101 and 103 and can convert the data formatting as well as provide encryption and decryption. The PCI Buffered Interfaces 105 and 107 are initialized also by the System Processor 109 as one-way or two-way ports to have bi-directional flow of data or security protection. Programming the System Processor 109 changes how the Gateway Controller 100 operates. In addition, using the System Resources 111, the Gateway Controller 100 can buffer data so as to collect data from one bus (PCI Bus 101 for example) until enough data exists and the other bus (PCI Bus 103 for example) is ready to receive it. Examples of components that can be used as the System Processor 109 are the Motorola 68340 chip and the Lockheed Martin Cypris chip (for encryption/decryption).

In general, applications in which the PCI Bus Gateway Controller 100 can be used include: Two way transfer/conversion of data between two independent buses; data collected on one bus transferred in packets to a high speed video bus; transfer and encryption of data (one-way) from a secure bus to an open bus; and isolation, transfer and translation of data from a network (the World Wide Web for example) to a local network or individual computer.

Figure 2:
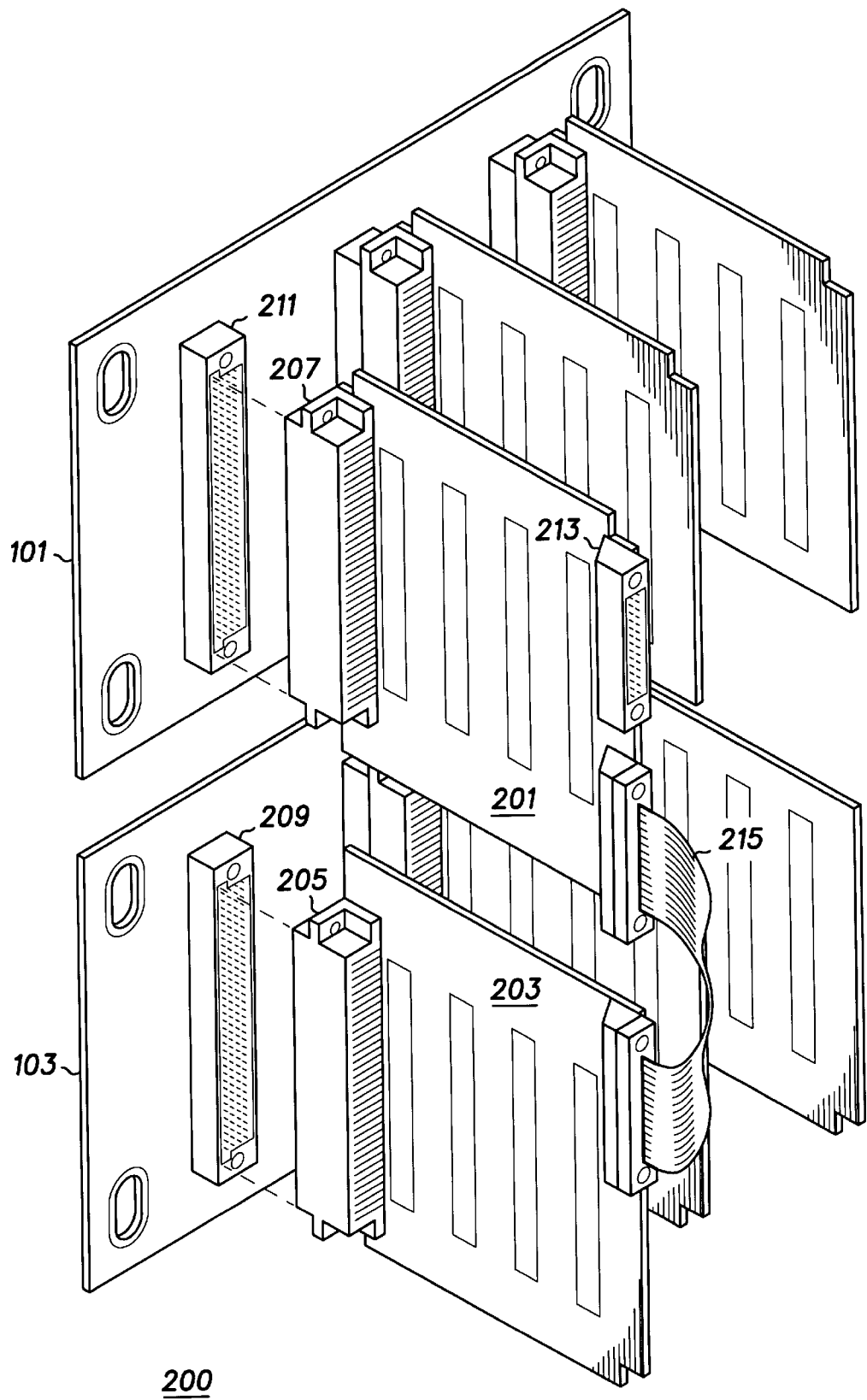
FIG. 2 is an isometric drawing of the mechanical configuration of a two board implementation of the Gateway Controller of FIG. 1 in accordance with the present invention.

FIG. 2 shows a the mechanical configuration illustrating a two printed wiring board method of interconnecting the PCI Buses 101 and 103. As shown in FIG. 2, each Gateway Controller 100 Printed Wiring Board 201 and 203 has an Edge Card Connection 205 and 207, respectively, that plugs into the PCI Bus Connectors 209 and 211, respectively. The signals from the Edge Card Connections 205 and 207 are coupled through the PCI Buffered Interfaces 105 and 107 shown in FIG. 1.

An "over the top" Cable 215 connects the two Printed Wiring Boards 201 and 203 and hence the two PCI Buses 101 and 103. The System Processor 109 can be on both Boards 201 and 203 for redundancy but is shown in FIG. 2 on only one of the Printed Wiring Boards (in this case, Printed Wiring Board 201). Great care must be taken in this design to maintain signal balance between the two Printed Wiring Boards 201 and 203 due to the need for drivers for the Cable 215. The PCI Buses 101 and 103 may be separated by any distance but would normally be chosen to allow packaging the entire system in a 19 inch rack, for example. The printed wiring board can be of standard material for through hole or surface mount or of commercially available polymer or ceramic base material for "chip on board". The connector 213 allows programming the System Processor 109 from an external programming source (not shown).

Figure 3:
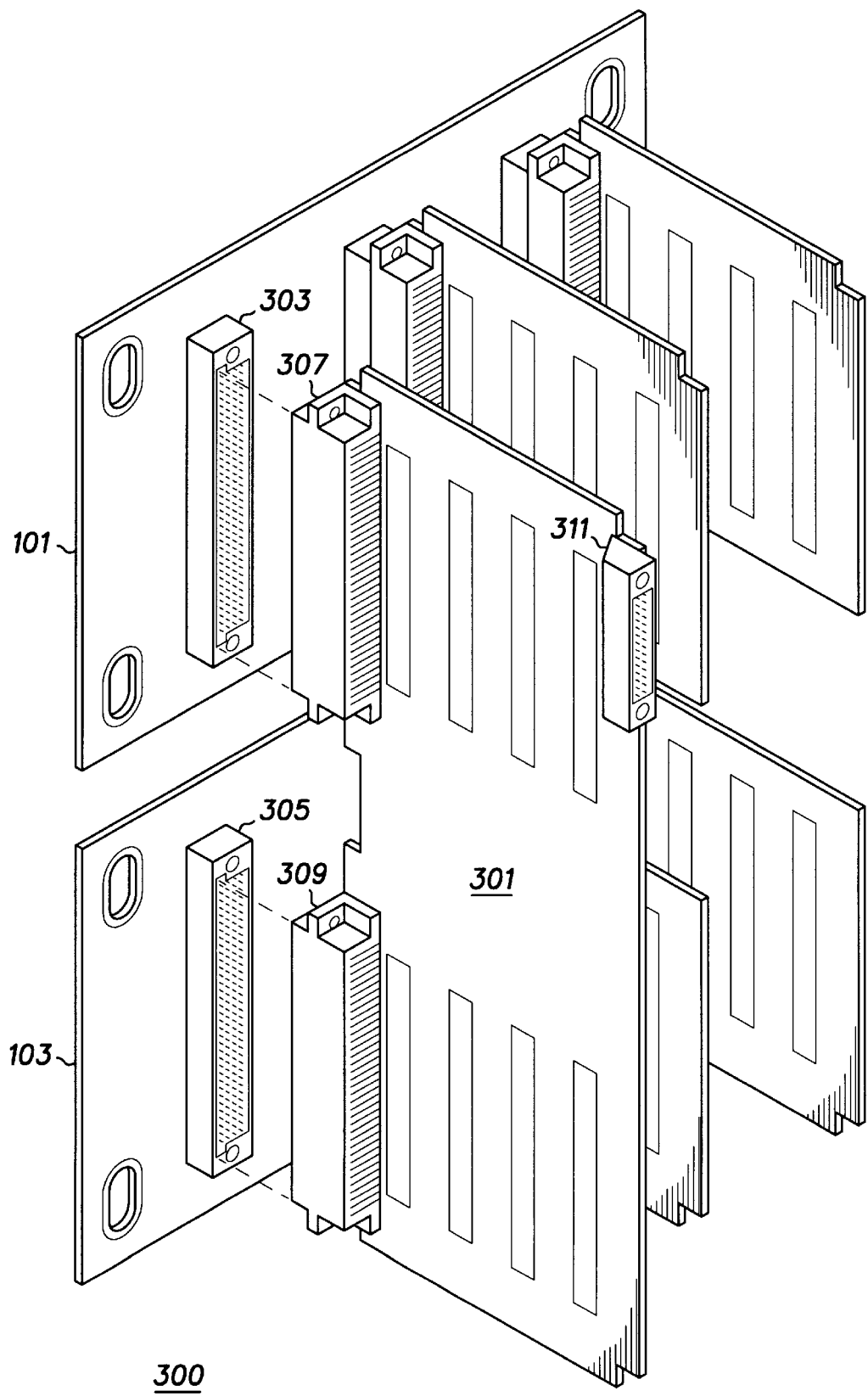
FIG. 3 is an isometric drawing of the mechanical configuration of a single board implementation of the Gateway Controller of FIG. 1 in accordance with the present invention.

FIG. 3 shows a mechanical configuration illustrating the preferred embodiment of a single printed wiring board method of interconnecting the PCI Buses 101 and 103. This method provides more rapid data transfer and simplicity of design compared to the required complexity of each printed wiring board in the two board approach (since no balanced drivers are needed). See FIG. 2. Further, the FIG. 3 configuration allows easy use of components such as opto isolators or couplers for physical isolation.

As shown in FIG. 3, the Gateway Controller 100 Printed Wiring Board 301 has two edge Card Connections 307 and 309 that plug into PCI Bus Connectors 303 and 305, respectively. When a connection of edge Card Connections 307 and 309 is simultaneously made with PCI Bus Connectors 303 and 305, the signals from the Edge Card Connections 307 and 309 allow signal coupling through the PCI Buffered Interfaces 105 and 107, respectively, shown in FIG. 1. The PCI Buses 101 and 103 may be separated by any distance but would normally be chosen to allow packaging the entire system in a 19 inch rack, for example. The printed wiring board can be of standard material for through hole or surface mount or of commercially available polymer or ceramic base material for "chip on board". The connector 311 allows programming the System Processor 109 from an external programming source (not shown).

The overall process is as follows:

1. Initialization—Upon power turn-on, each PCI Bus 101 and 103 and bus host will initialize its own PCI Port Buffered Interface 105 and 107 of FIG. 1. The initialization information includes data as to the location and designation of each board on. PCI Buses 101 and 103 to allow communication between the Gateway Controller 100 and the target boards on the bus directly.

2. Authorization—The next step of the process requires the initialization of the Gateway Controller 100 Signal Processor 109. This can be accomplished as selected in the detailed design, namely from one of the PCI Interfaces 105 or 107 or directly from an external programming source communicating with the Gateway Controller 100 through Signal Processor 109 via Connector 311 on the Gateway Controller 100 board. This authorization includes the direction of data allowed (whether to and/or from each bus) and the allowable targets on each PCI Bus 101 and 103. The authorization instructions also include the level of security required for specific messages from the PCI Buses 101 and 103 (multiple levels of security may be used). Also included in the authorization are the types of data transfer to be used. These may include direct transfer, conversion/ translation, and encryption/decryption.

3. Operation—Assume that data is presented to PCI Port Buffered Interface 105 from PCI Bus 101. The PCI Port Buffered Interface 105 informs the System Processor 109 that data including instructions as to disposition of the data has been received. If the System Processor 109 authorization allows, the System Processor 109 will fetch the data from the PCI Port Interface 105. Using the instructions contained in the data and the initial authorization, the System Processor 109 will process the data as required. The data (transformed if required) will then be transferred to the appropriate PCI Port Buffered Interface 105 or 107 depending on the target.

Thus the Single Board PCI Bus Gateway Controller 100 allows data control, bus security and physical isolation while reducing electrical and mechanical complexity. Such bus controllers are particularly useful in open architecture radio and computer systems.

Although the current preferred embodiment of the invention has been illustrated and that form described in detail, it will be readily apparent to those skilled in the art that various modifications may be made therein without departing from the spirit of the invention or from the scope of the appended claims.

What is claimed is:

1. A peripheral component interface (PCI) gateway controller comprising:

at least two separate buses adapted to be coupled for an exchange of information between peripherals coupled to each of said at least two separate buses;

a PCI controller coupled to said at least two separate buses, said controller for facilitating said exchange of information between said at least two separate buses;

said PCI controller comprising: a single printed wiring board for simultaneous coupling to said at least two separate buses through said PCI controller;

a first connector coupled to a first bus of said at least two separate buses;

a second connector coupled to a second bus of said at least two separate buses;

at least first and second connections, said at least first and second connections respectively corresponding to said first and second connectors; and said first and second connections are simultaneously connected to said first and second connectors respectively.

2. A PCI gateway controller as claimed in claim 1, wherein said controller further includes:

a first port coupled to said first bus for buffering said information exchanged with said first bus; and a second port coupled to said second bus for buffering said information exchanged with said second bus.

3. A PCI gateway controller as claimed in claim 2, where said first port and said second port each include a PCI port buffered interface.

4. A PCI gateway controller as claimed in claim 2, wherein said controller further includes:

a processor for formatting and converting said information exchanged between said at least two separate buses;

random access memory coupled to said processor; and read only memory coupled to said processor.

5. A PCI gateway controller as claimed in claim 4, wherein said processor includes a microprocessor.

6. A peripheral component interface (PCI) gateway controller comprising:

at least two separate buses adapted to be coupled for an exchange of information between peripherals coupled to each of said at least two separate buses;

a PCI controller coupled to said at least two separate buses, said controller for facilitating said exchange of information between said at least two separate buses;

said PCI controller further comprising:

a first printed wiring board adapted to be coupled to a first bus of said at least two separate buses;

a second printed wiring board adapted to be coupled to a second bus of said at least two separate buses;

means for coupling said first and second printed wiring boards for simultaneously coupling said at least two separate buses through said PCI controller;

said means for coupling includes a cable connection;

a first port coupled to said first bus for buffering said information exchanged with said first bus;

a second port coupled to said second bus for buffering said information exchanged with said second bus; and said first port and said second port each include a PCI port buffered interface.

7. A PCI gateway controller as claimed in claim 6, wherein said controller further includes:

a processor for formatting and converting said information exchanged between said at least two separate buses;

random access memory coupled to said processor; and read only memory coupled to said processor.

8. A PCI gateway controller as claimed in claim 7, wherein said processor includes a microprocessor.

* * * * *

UNITED STATES PATENT AND TRADEMARK OFFICE
CERTIFICATE OF CORRECTION

PATENT NO. : 5,848,252
DATED : December 8, 1998
INVENTOR(S) : Robert Henry Granau, et. al.

It is certified that error appears in the above-identified patent and that said Letters Patent is hereby corrected as shown below:

Column 1, line 3, insert the following:

This invention was made with Government Support under F30602-95-C-0026 awarded by the Air Force. The Government has certain rights in this invention.

Signed and Sealed this

Twelfth Day of September, 2000

Attest:

Q. TODD DICKINSON

*Attesting Officer*     *Director of Patents and Trademarks*